(12) United States Patent
Hyatt et al.

(10) Patent No.: US 9,963,984 B2
(45) Date of Patent: May 8, 2018

(54) STRUCTURAL GUIDE VANE FOR GAS TURBINE ENGINE

(71) Applicant: UNITED TECHNOLOGIES CORPORATION, Hartford, CT (US)

(72) Inventors: Thomas B. Hyatt, Cromwell, CT (US); Carl Brian Klinetob, East Haddam, CT (US); Jason Leroux, Kensington, CT (US)

(73) Assignee: United Technologies Corporation, Farmington, CT (US)

(*) Notice: Subject to any disclaimer, the term of this patent is extended or adjusted under 35 U.S.C. 154(b) by 340 days.

(21) Appl. No.: 14/765,138

(22) PCT Filed: Mar. 5, 2014

(86) PCT No.: PCT/US2014/020476
§ 371 (c)(1),
(2) Date: Jul. 31, 2015

(87) PCT Pub. No.: WO2014/138147
PCT Pub. Date: Sep. 12, 2014

(65) Prior Publication Data
US 2015/0361807 A1    Dec. 17, 2015

Related U.S. Application Data

(60) Provisional application No. 61/773,914, filed on Mar. 7, 2013.

(51) Int. Cl.
*F03B 1/02* (2006.01)
*F03B 11/02* (2006.01)
(Continued)

(52) U.S. Cl.
CPC .......... *F01D 9/04* (2013.01); *F01D 25/162* (2013.01); *F01D 25/246* (2013.01); *F02C 3/04* (2013.01); *F02C 7/20* (2013.01); *Y02T 50/671* (2013.01)

(58) Field of Classification Search
CPC .......... F01D 9/02; F01D 9/042; F01D 25/246; F01D 25/28; F02C 7/20; F05D 2220/32;
(Continued)

(56) References Cited

U.S. PATENT DOCUMENTS 6,371,725 B1 *  4/2002  Manteiga .................. F01D 5/14
                                                    415/209.4
6,494,677 B1 * 12/2002  Grady ..................... B23P 6/002
                                                    29/889.7
(Continued)

FOREIGN PATENT DOCUMENTS

EP    2312186 A1    4/2011
EP    2472059 A1    7/2012
(Continued)

OTHER PUBLICATIONS

International Preliminary Report for International Application No. PCT/US2014/020476 dated Dec. 10, 2015.
(Continued)

*Primary Examiner* — Deming Wan
(74) *Attorney, Agent, or Firm* — Carlson, Gaskey & Olds, P.C.

(57) ABSTRACT

A guide vane for use in a gas turbine engine fan section has an airfoil extending between a radially inner platform and a radially outer platform. The radially inner platform has a radially outwardly facing surface from which the airfoil extends and a radially inwardly facing underside. The airfoil has a trailing edge extending to a leading edge. The underside is attached to a mount bracket and a main rib extending
(Continued)

from the underside of the platform adjacent the trailing edge and in a direction generally towards the leading edge, and merging into a top surface on the mount bracket. A pair of shoulders is formed on each of two circumferential sides of the rib. Each of the shoulders is spaced from each other at a point on the shoulders connected into the top surface of the mount bracket. The shoulders extend circumferentially toward each other and the under surface.

18 Claims, 5 Drawing Sheets

(51) Int. Cl.
| | |
|---|---|
| F04D 29/60 | (2006.01) |
| F01D 9/04 | (2006.01) |
| F01D 25/16 | (2006.01) |
| F01D 25/24 | (2006.01) |
| F02C 7/20 | (2006.01) |
| F02C 3/04 | (2006.01) |

(58) Field of Classification Search
CPC ............. F05D 2230/60; F05D 2240/80; F05D 2260/94; Y02T 50/671; Y02T 50/673
USPC ............................................ 415/209.3, 209.4
See application file for complete search history.

(56) References Cited

U.S. PATENT DOCUMENTS

| | | | | |
|---|---|---|---|---|
| 6,558,115 | B2* | 5/2003 | Tiemann | F01D 9/042 |
| | | | | 415/115 |
| 6,685,431 | B2* | 2/2004 | Hiskes | B23P 6/005 |
| | | | | 29/889.1 |
| 6,931,728 | B2 | 8/2005 | Howard et al. | |
| 8,236,409 | B2 | 8/2012 | Morrison et al. | |
| 8,550,776 | B2* | 10/2013 | McDonald | F01D 5/282 |
| | | | | 415/209.4 |
| 2002/0076320 | A1 | 6/2002 | Glover et al. | |
| 2009/0208332 | A1 | 8/2009 | Weinstein et al. | |
| 2011/0265406 | A1 | 11/2011 | Morrison et al. | |
| 2012/0213634 | A1 | 8/2012 | Samuelsson et al. | |

FOREIGN PATENT DOCUMENTS

| | | |
|---|---|---|
| WO | 2009048357 A1 | 4/2009 |
| WO | 2013191877 A1 | 12/2013 |

OTHER PUBLICATIONS

International Search Report from corresponding PCT/US2014/020476, dated Jul. 3, 2014.

Supplementary European Search Report for European Application No. 14760482.1 completed Jun. 3, 2016.

* cited by examiner

US 9,963,984 B2

STRUCTURAL GUIDE VANE FOR GAS TURBINE ENGINE

CROSS-REFERENCE TO RELATED APPLICATION

This application claims priority to U.S. Provisional Application No. 61/773,914, filed Mar. 7, 2013.

BACKGROUND

This application relates to a structural guide vane for use in a gas turbine engine.

Gas turbine engines are known and, when utilized on an aircraft, they typically include a fan delivering air into a compressor and into a bypass duct defined by a nacelle. Downstream of the fan, there is typically a row of structural guide vanes, which extend between a core engine housing radially outwardly to an inner surface of the nacelle.

Historically, a turbine drove a compressor section and a fan rotor at a common speed. More recently, a gear reduction has been provided between a fan drive turbine and the fan rotor. This allows the fan to rotate at slower speeds and has further allowed an increase in the fan diameter.

As the fan diameter increases, a bypass ratio or the volume of air delivered into the bypass duct, compared to the volume of air delivered into the compressor, has increased dramatically. With this dramatic increase in the fan diameter and the bypass ratio, the radial length of the guide vanes has increased. To reduce weight, these guide vanes have become structural.

SUMMARY

In a featured embodiment, a guide vane for use in a gas turbine engine fan section has an airfoil extending between a radially inner platform and a radially outer platform. The radially inner platform has a radially outwardly facing surface from which the airfoil extends and a radially inwardly facing underside. The airfoil has a trailing edge extending to a leading edge. The underside is attached to a mount bracket and a main rib extending from the underside of the inner platform adjacent to the trailing edge and in a direction generally towards the leading edge, and merging into a top surface on the mount bracket. A pair of shoulders is formed on each of two circumferential sides of the main rib. Each of the shoulders is spaced from each other at a point on the shoulders connected into the top surface of the mount bracket. The shoulders extend circumferentially toward each other and toward the under surface.

In another embodiment according to the previous embodiment, the shoulders have a first portion extending toward an opposed first portion of the other of the shoulders. A second portion extends generally radially outwardly to merge into the underside of the inner platform. The second portion of the two shoulders is closer to parallel than are the first portions.

In another embodiment according to any of the previous embodiments, the main rib is radially thinner adjacent the trailing edge than it is at a location where it merges into the top surface of the mount bracket.

In another embodiment according to any of the previous embodiments, the main rib extends beyond the shoulders and the mount bracket in a direction toward the trailing edge.

In another embodiment according to any of the previous embodiments, the underside is formed with a rib extension extending from the mount bracket in a direction toward the leading edge. The rib extension extends toward the leading edge and has a central web merging into a Y-shaped pair of webs, and then to a pair of bolt holes.

In another embodiment according to any of the previous embodiments, a forward web connects the bolt holes.

In another featured embodiment, a fan section has a fan rotor and blades. At least one guide vane includes an airfoil extending between a radially inner platform and a radially outer platform. The radially inner platform has a radially outwardly facing surface from which the airfoil extends and a radially inwardly facing underside. The airfoil has a trailing edge extending to a leading edge. The underside is attached to a mount bracket and a main rib extending from the underside of the inner platform adjacent the trailing edge and in a direction generally towards the leading edge, and merging into a top surface on the mount bracket. A pair of shoulders is formed on each of two circumferential sides of the main rib. Each of the shoulders is spaced from each other at a point on the shoulders connected into the top surface of the mount bracket. The shoulders extend circumferentially toward each other and toward the under surface.

In another embodiment according to the previous embodiment, the shoulders have a first portion extending toward an opposed first portion of the other of the shoulders. A second portion extends generally radially outwardly to merge into the underside of the inner platform. The second portions of the two shoulders are closer to parallel than are the first portions.

In another embodiment according to any of the previous embodiments, the main rib is radially thinner adjacent the trailing edge than it is at a location where it merges into the top surface of the mount bracket.

In another embodiment according to any of the previous embodiments, the main rib extends beyond the shoulders and the mount bracket in a direction toward the trailing edge.

In another embodiment according to any of the previous embodiments, the underside is formed with a rib extension extending from the mount bracket in a direction toward the leading edge. The rib extension extends toward the leading edge and has a central web merging into a Y-shaped pair of webs, and then to a pair of bolt holes.

In another embodiment according to any of the previous embodiments, a forward web connects the bolt holes.

In another featured embodiment, a gas turbine engine has a compressor, a turbine, a fan section, a fan rotor and blades, and a nacelle defining a bypass duct, and at least one guide vane in the bypass duct. The guide vane includes an airfoil extending between a radially inner platform and a radially outer portion. The radially inner platform has a radially outwardly facing surface from which the airfoil extends and a radially inwardly facing underside. The airfoil has a trailing edge extending to a leading edge. The underside is attached to a mount bracket and a main rib extending from the underside of the inner platform adjacent the trailing edge and in a direction generally towards the leading edge, and merging into a top surface on the mount bracket. A pair of shoulders is formed on each of two circumferential sides of the main rib. Each of the shoulders is spaced from each other at a point on the shoulders connected into the top surface of the mount bracket. The shoulders extend circumferentially toward each other and toward the under surface.

In another embodiment according to the previous embodiment, the shoulders have a first portion extending toward an opposed first portion of the other of the shoulders. A second portion extends generally radially outwardly to merge into the underside of the inner platform. The second portions of the two shoulders are closer to parallel than are the first portions.

In another embodiment according to any of the previous embodiments, the main rib is radially thinner adjacent the trailing edge than it is at a location where it merges into the top surface of the mount bracket.

In another embodiment according to any of the previous embodiments, the main rib extends beyond the shoulders and mount bracket in a direction toward the trailing edge.

In another embodiment according to any of the previous embodiments, the underside is formed with a rib extension extending from the mount bracket in a direction toward the leading edge. The rib extension extends toward the leading edge and has a central web merging into a Y-shaped pair of webs, and then to a pair of bolt holes.

In another embodiment according to any of the previous embodiments, a forward web connects the bolt holes.

These and other features may be best understood from the following drawings and specification.

DETAILED DESCRIPTION

Figure 1:
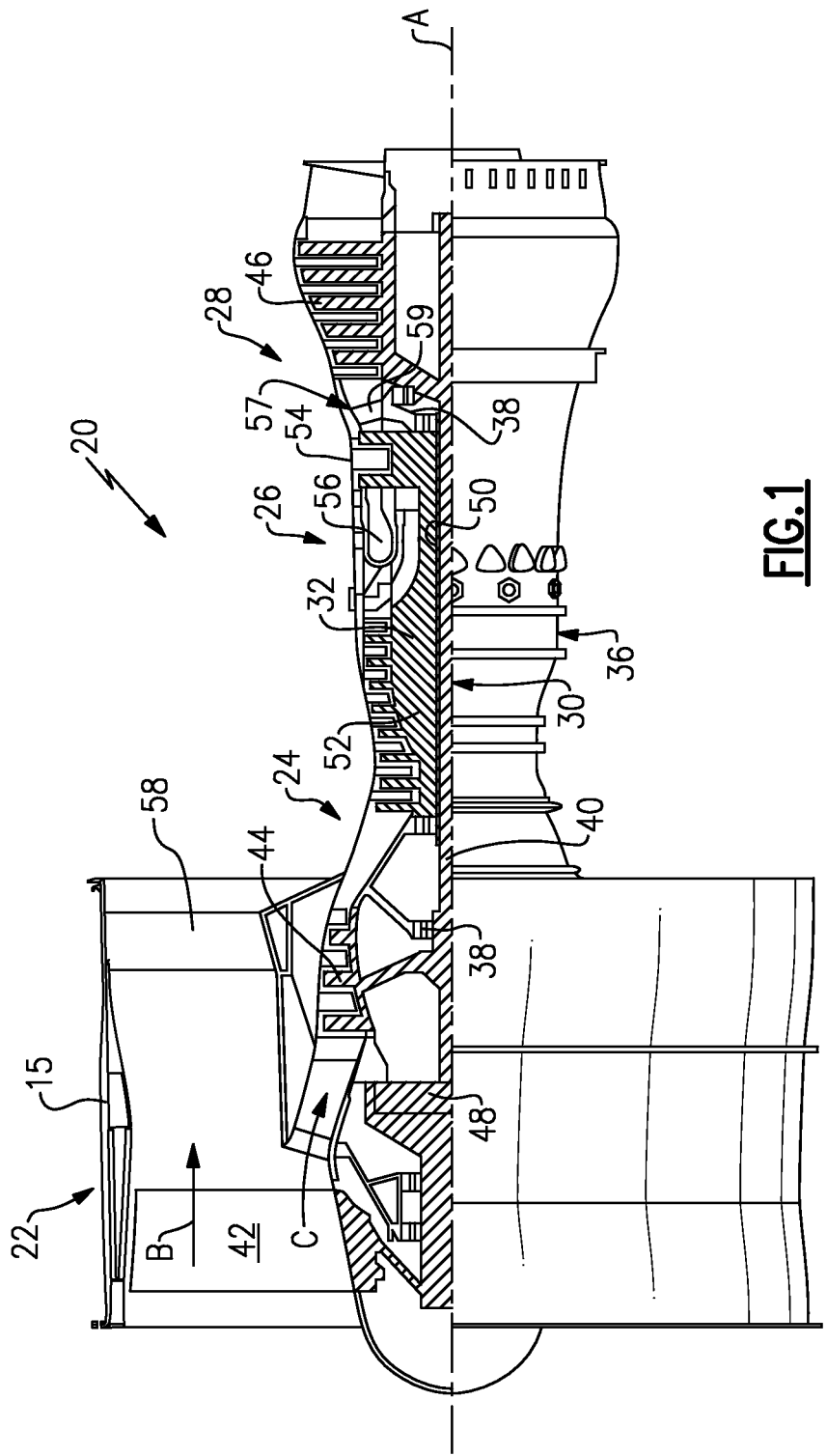
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. A fan guide vane 58 is downstream of the fan 42. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R.)/(518.7^\circ R.)]^{0.5}$. The "Low corrected fan tip speed" as disclosed herein according to one non-limiting embodiment is less than about 1150 ft/second.

Figure 2:
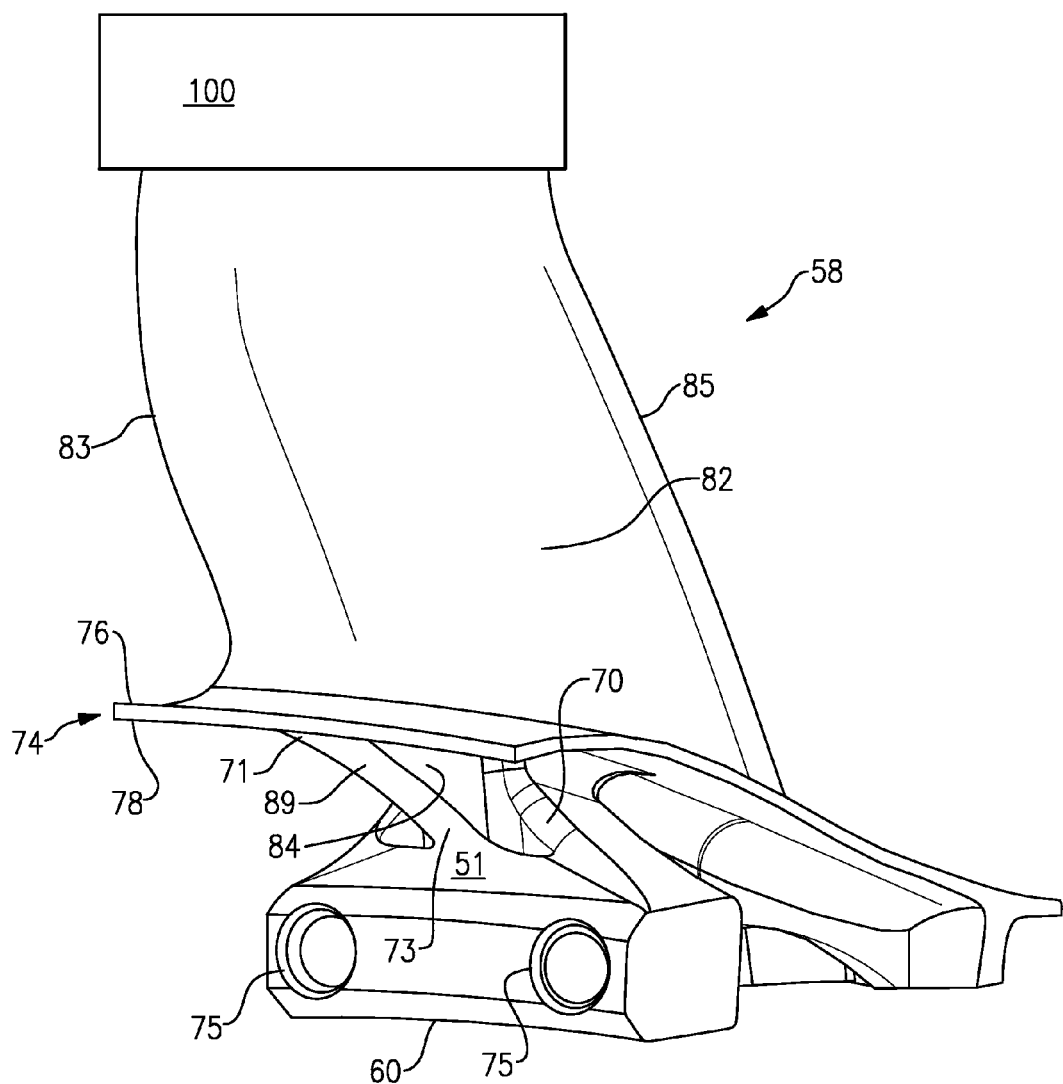
FIG. 2 shows a fan guide vane.

A fan guide vane 58 is illustrated in FIG. 2. As known, an airfoil 82 extends from a radially inner platform 74 to a radially outer platform 100. Platform 100 is shown schematically in this view. The airfoil 82 extends from a trailing edge 83 to a leading edge 85. The platform 74 has a radially outward facing surface 76 and the airfoil 82 extends from that surface. A radially underside surface 78 of the platform 74 receives a mount bracket 60. Bolt holes 75 are formed in the mount bracket 60.

A rib 89 extends radially outwardly of the underside 78 and at an angle such that it is thinnest at a point 71 adjacent a trailing edge of the platform 74, and gets thicker before merging into an upper or top surface 51 of the mount bracket 60 adjacent a point 73. A shoulder 70 is shown on one circumferential side of the rib 89. The rib 89 has a side 84 spaced away from the shoulder 70. The rib extends beyond shoulders 70/72 and the mount bracket 60 in a direction toward trailing edge 83.

Figure 3:
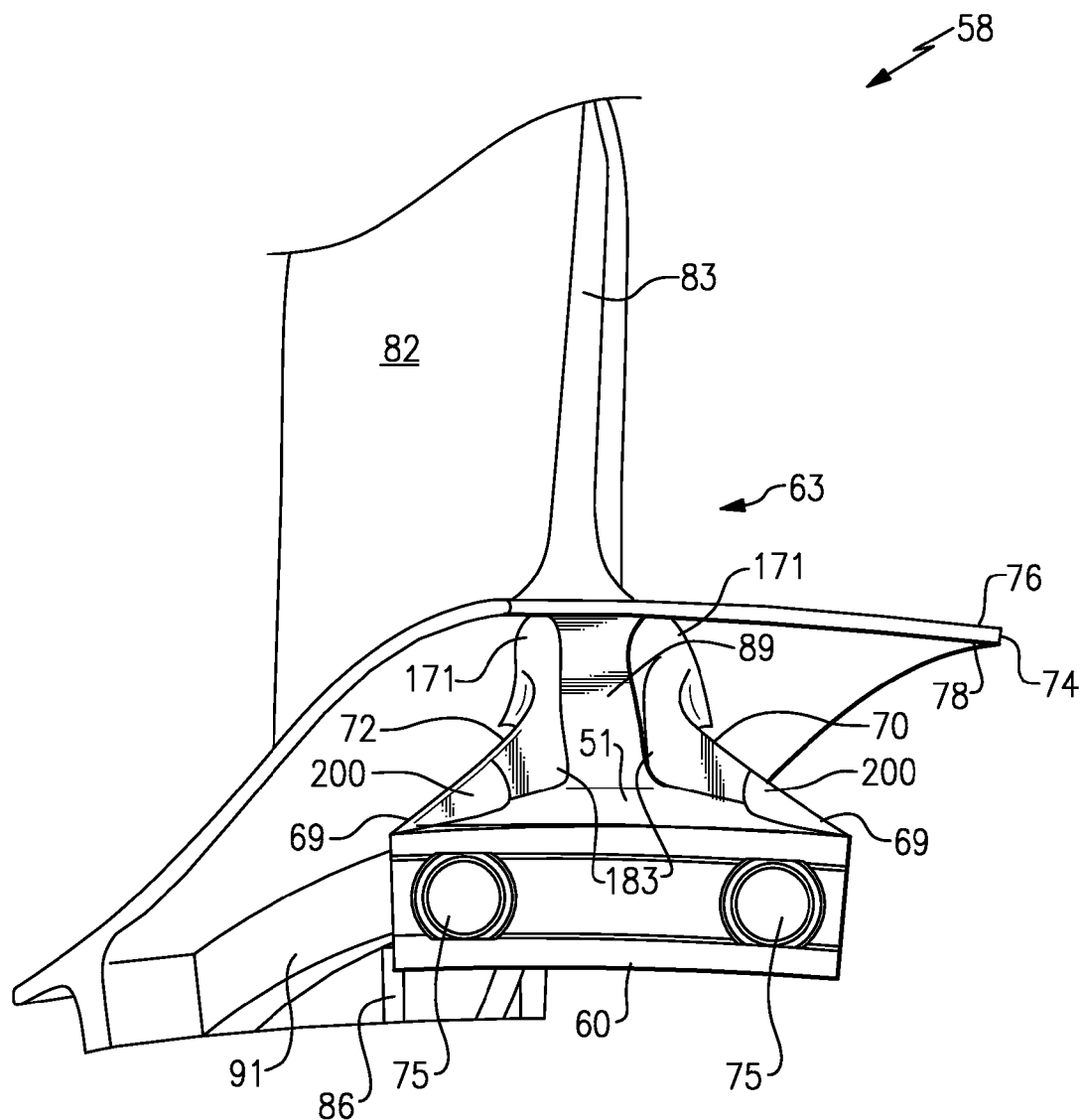
FIG. 3 is a rear view of the fan guide vane.

FIG. 3 is a rear view of the guide vane 58. As shown, the rib 89 has extensions 91 and 86, extending forwardly toward the leading edge. The shoulder 70 is provided on one side of the rib 89 and a matching shoulder 72 is formed on an opposed circumferential side.

As can be seen, the two shoulders 70, 72 are spaced closer to each other at a point 171 at which they merge into the platform underside 78, and spaced further from each other at a point 69 where they connect into the top surface 51 of mount bracket 60.

The shoulders have a first portion 200 extending in a circumferential direction towards each other, and then a straight portion 183 extending generally parallel to each other, and merging into the underside 78. The portions 183 may not be exactly parallel, but they are closer to being parallel than are portions 200.

The structure of the shoulders 70, 72, thus, is softer at the point 171 at which it merges into the platform surface 78, and stiffer at portions 200 extending along the mount bracket 60. The softer structure adjacent point 171 allows for a better reception of the stresses from the airfoil 82, while the stiffer surface adjacent area 200 provides better side to side or circumferential bending support.

Figure 4:
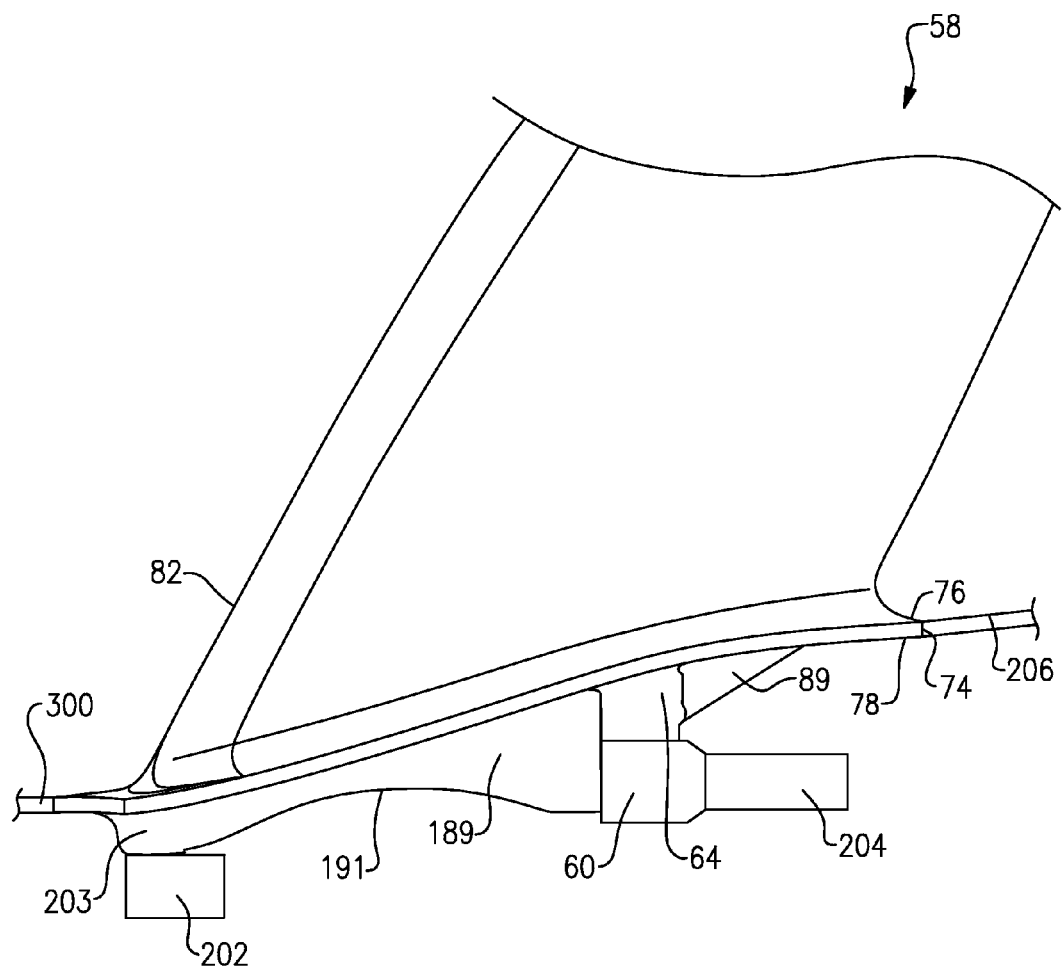
FIG. 4 is a side view schematically showing mounting structure.

FIG. 4 schematically shows the vane 58 mounted within a gas turbine engine structure. As shown, a compressor case 300 and 206 is mounted adjacent to the ends of platform 74. As can be seen, the rib 89 has a portion 189 extending forwardly and which is curved at 191. Bracket 204 is shown schematically and will bolt to the mount bracket 60 to secure vane 58 to the compressor case 206/300. A second bracket 202 bolts to a forward end 203 of the guide vane 58.

Figure 5:
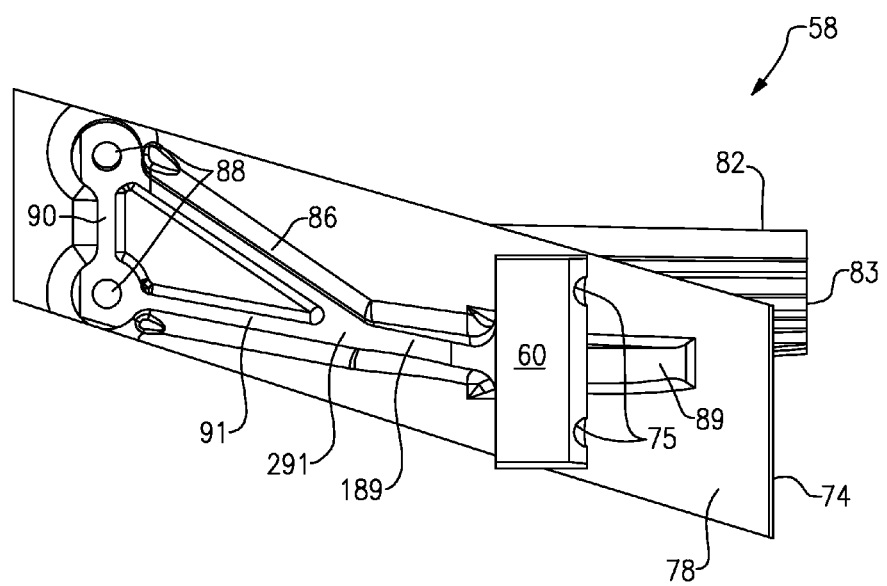
FIG. 5 shows a radially inner view of the fan guide vane.

FIG. 5 shows the underside of the guide vane 58. As shown, the rib portion 189 extends toward a leading edge from a trailing edge 83 of the airfoil. There is a Y-shaped structure formed by webs 91/86 extending from a central web 291 of the rib portion 189, and extending to bolt holes 88 which are connected by a rib 90. The bolt holes 88 receive bolts to attach to the bracket 202 (see FIG. 4).

The guide vane 58 as disclosed in this application, thus, provides efficient support and reaction against the forces it will see when in use.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A guide vane for use in a gas turbine engine fan section comprising:
   an airfoil extending between a radially inner platform and a radially outer platform;
   said radially inner platform having a radially outwardly facing surface from which said airfoil extends and a radially inwardly facing underside, said airfoil having a trailing edge extending to a leading edge;
   said radially inwardly facing underside being attached to a mount bracket and a main rib extending from said radially inwardly facing underside of said radially inner platform adjacent to said trailing edge and in a direction generally towards said leading edge, and merging into a top surface on said mount bracket;
   a pair of shoulders formed on each of two circumferential sides of said main rib, each of said pair of shoulders being spaced from each other at a point on said pair of shoulders connected into said top surface of said mount bracket, and said pair of shoulders extending circumferentially toward each other and extending toward said radially inwardly facing underside; and
   such that said pair of shoulders merge into said radially inwardly facing underside, and connect into said top surface of said mount bracket, and said pair of shoulders being spaced closer to each other at a point at which said pair of shoulders merge into said radially inwardly facing underside, then they are spaced at a point wherein said pair of shoulders connect into said top surface of said mount bracket.

2. The guide vane as set forth in claim 1, wherein said pair of shoulders having a first portion extending toward an opposed first portion of the other of said pair of shoulders, and then having a second portion extending generally radially outwardly to merge into said radially inwardly facing underside of said radially inner platform, with said second portion of said pair of shoulders being closer to parallel than are said first portions.

3. The guide vane as set forth in claim 1, wherein said main rib being radially thinner adjacent said trailing edge than it is at a location where it merges into said top surface of said mount bracket.

4. The guide vane as set forth in claim 1, wherein said main rib extending beyond said pair of shoulders and said mount bracket in a direction toward said trailing edge.

5. The guide vane as set forth in claim 1, wherein the radially inwardly facing underside being formed with a rib extension extending from said mount bracket in a direction toward said leading edge, and said rib extension extending toward said leading edge and having a central web merging into a Y-shaped pair of webs, and then to a pair of bolt holes.

6. The guide vane as set forth in claim 5, wherein a forward web connects said pair of bolt holes.

7. A fan section comprising:
   a fan rotor and blades;
   at least one guide vane, the at least one guide vane including an airfoil extending between a radially inner platform and a radially outer platform, said radially inner platform having a radially outwardly facing surface from which said airfoil extends and a radially inwardly facing underside, said airfoil having a trailing edge extending to a leading edge, said radially inwardly facing underside being attached to a mount bracket and a main rib extending from said radially inwardly facing underside of said radially inner platform adjacent said trailing edge and in a direction generally towards said leading edge, and merging into a top surface on said mount bracket, and a pair of shoulders formed on each of two circumferential sides of said main rib, each of said pair of shoulders being spaced from each other at a point on said pair of shoulders connected into said top surface of said mount bracket, and said pair of shoulders extending circumferentially toward each other and extending toward said radially inwardly facing underside;
   and such that said pair of shoulders merge into said radially inwardly facing underside, and connect into said top surface of said mount bracket, and said pair of shoulders being spaced closer to each other at a point at which said pair of shoulders merge into said radially inwardly facing underside, then they are spaced at a point wherein said pair of shoulders connect into said top surface of said mount bracket.

8. The fan section as set forth in claim 7, wherein said pair of shoulders having a first portion extending toward an opposed first portion of the other of said pair of shoulders, and then having a second portion extending generally radially outwardly to merge into said radially inwardly facing underside of said radially inner platform, with said second portions of said pair of shoulders being closer to parallel than are said first portions.

9. The fan section as set forth in claim 7, wherein said main rib being radially thinner adjacent said trailing edge than it is at a location where it merges into said top surface of said mount bracket.

10. The fan section as set forth in claim 7, wherein said main rib extending beyond said pair of shoulders and said mount bracket in a direction toward said trailing edge.

11. The fan section as set forth in claim 7, wherein the radially inwardly facing underside being formed with a rib extension extending from said mount bracket in a direction toward said leading edge, and said rib extension extending toward said leading edge and having a central web merging into a Y-shaped pair of webs, and then to a pair of bolt holes.

12. The fan section as set forth in claim 11, wherein a forward web connects said pair of bolt holes.

13. A gas turbine engine comprising:
a compressor and a turbine;
a fan section, a fan rotor and blades and a nacelle defining a bypass duct, and at least one guide vane in said bypass duct;
the at least one guide vane including an airfoil extending between a radially inner platform and a radially outer portion, said radially inner platform having a radially outwardly facing surface from which said airfoil extends and a radially inwardly facing underside, said airfoil having a trailing edge extending to a leading edge, said radially inwardly facing underside being attached to a mount bracket and a main rib extending from said radially inwardly facing underside of said radially inner platform adjacent said trailing edge and in a direction generally towards said leading edge, and merging into a top surface on said mount bracket, and a pair of shoulders formed on each of two circumferential sides of said main rib, each of said pair of shoulders being spaced from each other at a point on said pair of shoulders connected into said top surface of said mount bracket, and said pair of shoulders extending circumferentially toward each other and extending toward said under surface; and such that said pair of shoulders merge into said radially inwardly facing underside, and connect into said top surface of said mount bracket, and said pair of shoulders being spaced closer to each other at a point at which said pair of shoulders merge into said radially inwardly facing underside, then they are spaced at a point wherein said pair of shoulders connect into said top surface of said mount bracket.

14. The gas turbine engine as set forth in claim 13, wherein said pair of shoulders having a first portion extending toward an opposed first portion of the other of said pair of shoulders, and then having a second portion extending generally radially outwardly to merge into said radially inwardly facing underside of said radially inner platform, with said second portions of said pair of shoulders being closer to parallel than are said first portions.

15. The gas turbine engine as set forth in claim 13, wherein said main rib being radially thinner adjacent said trailing edge than it is at a location where it merges into said top surface of said mount bracket.

16. The gas turbine engine as set forth in claim 13, wherein said main rib extending beyond said pair of shoulders and said mount bracket in a direction toward said trailing edge.

17. The gas turbine engine as set forth in claim 13, wherein the radially inwardly facing underside being formed with a rib extension extending from said mount bracket in a direction toward said leading edge, and said rib extension extending toward said leading edge and having a central web merging into a Y-shaped pair of webs, and then to a pair of bolt holes.

18. The gas turbine engine as set forth in claim 17, wherein a forward web connects said pair of bolt holes.

\* \* \* \* \*